United States Patent
Sinha et al.

(10) Patent No.: US 7,160,341 B2
(45) Date of Patent: Jan. 9, 2007

(54) SYSTEM FOR CONTROLLING FRONT AND BACK END TEMPERATURES OF A SHIFT REACTOR

(75) Inventors: Manish Sinha, Pittsford, NY (US); Paul T Yu, Pittsford, NY (US); Bruce J Clingerman, Palmyra, NY (US)

(73) Assignee: General Motors Corporation, Detroit, MI (US)

( * ) Notice: Subject to any disclaimer, the term of this patent is extended or adjusted under 35 U.S.C. 154(b) by 773 days.

(21) Appl. No.: 10/134,712

(22) Filed: Apr. 29, 2002

(65) Prior Publication Data

US 2003/0202910 A1 Oct. 30, 2003

(51) Int. Cl.
*B01J 8/00* (2006.01)
*B01J 7/00* (2006.01)
*C10J 3/20* (2006.01)
*B32B 27/04* (2006.01)
*B32B 5/02* (2006.01)

(52) U.S. Cl. ............................ 48/127.9; 48/61; 48/75; 422/105; 422/107; 422/108; 422/110; 422/111; 422/198; 422/211; 422/190

(58) Field of Classification Search ................ 422/109, 422/198, 190; 423/648.1, 650, 651, 652, 423/655, 656
See application file for complete search history.

(56) References Cited

U.S. PATENT DOCUMENTS

| | | | |
|---|---|---|---|
| 6,103,410 A | 8/2000 | Fuller et al. | |
| 6,358,638 B1 | 3/2002 | Rock et al. | |
| 6,394,207 B1 | 5/2002 | Skala | |
| 6,562,088 B1 * | 5/2003 | Ukai et al. | 48/197 R |
| 6,743,537 B1 * | 6/2004 | Shimazu | 429/17 |
| 6,811,578 B1 * | 11/2004 | Kunitake et al. | 48/127.9 |
| 6,972,119 B1 * | 12/2005 | Taguchi et al. | 422/188 |
| 2001/0002248 A1 * | 5/2001 | Ukai et al. | 423/652 |
| 2002/0071975 A1 * | 6/2002 | Shimazu | 429/17 |
| 2003/0129100 A1 * | 7/2003 | Ukai et al. | 422/177 |

OTHER PUBLICATIONS

Notification of Transmittal Of The International Search Report Or The Declaration, dated Aug. 29, 2003.

* cited by examiner

*Primary Examiner*—Alexa Neckel
*Assistant Examiner*—Kaity Handal
(74) *Attorney, Agent, or Firm*—Harness, Dickey & Pierce, P.L.C.

(57) ABSTRACT

A temperature control system and method controls temperatures of front and back ends of a shift reactor. Front and back end temperature sensors sense temperatures of the front and back ends of the shift reactor and generate front and back end temperature signals. An actuator injects fluid into the front end of the shift reactor. A controller communicates with the front end temperature sensor, the back end temperature sensor and the actuator and controls the temperature of the front end and the back end. The controller includes primary and secondary control loops. The secondary control loop communicates with the back end temperature sensor. The primary control loop communicates with the front end temperature sensor. The secondary control loop generates a temperature setpoint for the primary control loop. The secondary control loop has a slower response time that the primary control loop.

11 Claims, 2 Drawing Sheets

SYSTEM FOR CONTROLLING FRONT AND BACK END TEMPERATURES OF A SHIFT REACTOR

FIELD OF THE INVENTION

The present invention relates to shift reactors for fuel cells, and more particularly to temperature control systems for shift reactors.

BACKGROUND OF THE INVENTION

Fuel processors in fuel cell systems convert hydrocarbon fuel, such as gasoline, into a rich hydrogen stream. Gasoline is reformed to the hydrogen stream through a series of reactions with steam and/or air. Using exothermic heat, steam is generated, superheated, and fed into the fuel processor. Operation of the integrated fuel processor requires effective balancing of the reaction chemistry. Balancing is accomplished by controlling reactor temperature and pressures, stream composition, and steam generation. The temperature of the heat exchanger affects steam generation.

Water Gas Shift (WGS) or shift reactors exhibit slow temperature dynamics with large time delays and are non-linear over turndown. The amount of a reaction bed of the shift reactor that is used is directly proportional to the power level. For full power levels, reaction occurs throughout the shift reactor. For low power levels (such as idle conditions), only a small front section of the shift reactor is utilized. Under these low power conditions, the front and back ends of the shift reactor are typically at different temperatures. Consequently, active control of the temperature of the front-end does not adequately control the temperature of the back end. The lack of control cascades to the downstream reactors and ultimately impacts the generation of steam.

Currently an operator actively adjusts a desired temperature or setpoint of the front end of the reactor in lab environments. This may be acceptable on an experimental bench. For successful operation in a vehicle, however, the temperature of the front end must be adjusted automatically.

Referring now to FIG. 1, a conventional feedback controller 30 for a shift reactor 12 is shown. A front-end temperature sensor 14 senses a temperature of a front end 15 of the shift reactor 12. A pipe or conduit, an autothermal reactor, a partial oxidation reformer, or another shift reactor, which are generally identified at 16, may be located upstream from the shift reactor 12. A length of an exothermic section of the shift reactor 12 depends upon a power level of the shift reactor 12. For high power levels, the exothermic section may extend from the front end 15 to a back end 17 of the shift reactor 12. For lower power levels, the exothermic section may extend partially between the front end 15 and the back end 17. A reformate stream 18 is input to the front end 15 of the shift reactor 12. A back end temperature sensor 20 senses a temperature of the back end 17 of the shift reactor 12. A reformate stream 22 is output by a heat exchanger 24 to downstream reactors and vaporizers.

The front end temperature sensor 14 is connected to a feedback controller 30. The feedback controller 30 generates a flow signal to a water injector 32, which injects water into the front end 15 of the shift reactor 12. The water cools the front end 15 and provides temperature control. A temperature setpoint lookup table (LUT) 34 generates a desired front end temperature based on the fuel processor desired operating conditions, such as power level. The desired temperature is output from the lookup table 34 to the feedback controller 30. The feedback controller 30 outputs a water flow rate command to the injector 32.

The conventional feedback controller 30 measures and controls the temperature of the front end 15 to the desired temperature by metering the amount of water that is injected in the reformate stream 18. The injected water adjusts the front-end temperature quickly (on the order of tens of seconds and negligible time delay). Consequently the feedback controller 30 is capable of controlling the temperature of the front end 15 within a very narrow temperature range.

However, the conventional feedback controller 30 does not actively control the temperature of the back end 17 of the shift reactor 12. The temperature of the back end 17 can drift even when the temperature of the front end 15 is controlled. For example, factors such as power level, heat loss to ambient, variation in CO in the inlet reformate stream, catalyst degradation, low steam to carbon ratio, and other factors may cause the temperature of the back end to drift. Drifting of the back end 17 to a lower temperature will eventually cool the downstream low temperature shift or other downstream reactor and adversely impact steam generation by the PrOx vaporizer. A lack of temperature control of the back end 17 can also cause runaway in the fuel processor, which requires a shutdown.

SUMMARY OF THE INVENTION

A temperature control system and method according to the present invention controls front and back end temperatures of a shift reactor. A front end temperature sensor senses a temperature of the front end of the shift reactor and generates a front end temperature signal. A back end temperature sensor senses a temperature of the back end of the shift reactor and generates a back end temperature signal. An actuator injects fluid into the front end of the shift reactor. A controller communicates with the front and back end temperature sensors and the actuator and controls the temperatures of the front and back ends based on the front and back end temperature signals.

In other features, the controller includes primary and secondary control loops. The secondary control loop communicates with the back end temperature sensor. The primary control loop communicates with the front end temperature sensor. The secondary control loop generates a temperature setpoint for the primary control loop.

In still other features, the controller is implemented using primary and secondary controllers. The actuator is a water injector. The first and second temperature sensors are thermocouples. The secondary control loop has a slower response time than the primary control loop.

Further areas of applicability of the present invention will become apparent from the detailed description provided hereinafter. It should be understood that the detailed description and specific examples, while indicating the preferred embodiment of the invention, are intended for purposes of illustration only and are not intended to limit the scope of the invention.

BRIEF DESCRIPTION OF THE DRAWINGS

The present invention will become more fully understood from the detailed description and the accompanying drawings, wherein.

DETAILED DESCRIPTION OF THE PREFERRED EMBODIMENTS

The following description of the preferred embodiment(s) is merely exemplary in nature and is in no way intended to limit the invention, its application, or uses. For purposes of clarity, the same reference numbers will be used in the FIGS. where appropriate to identify similar elements.

Figure 1:
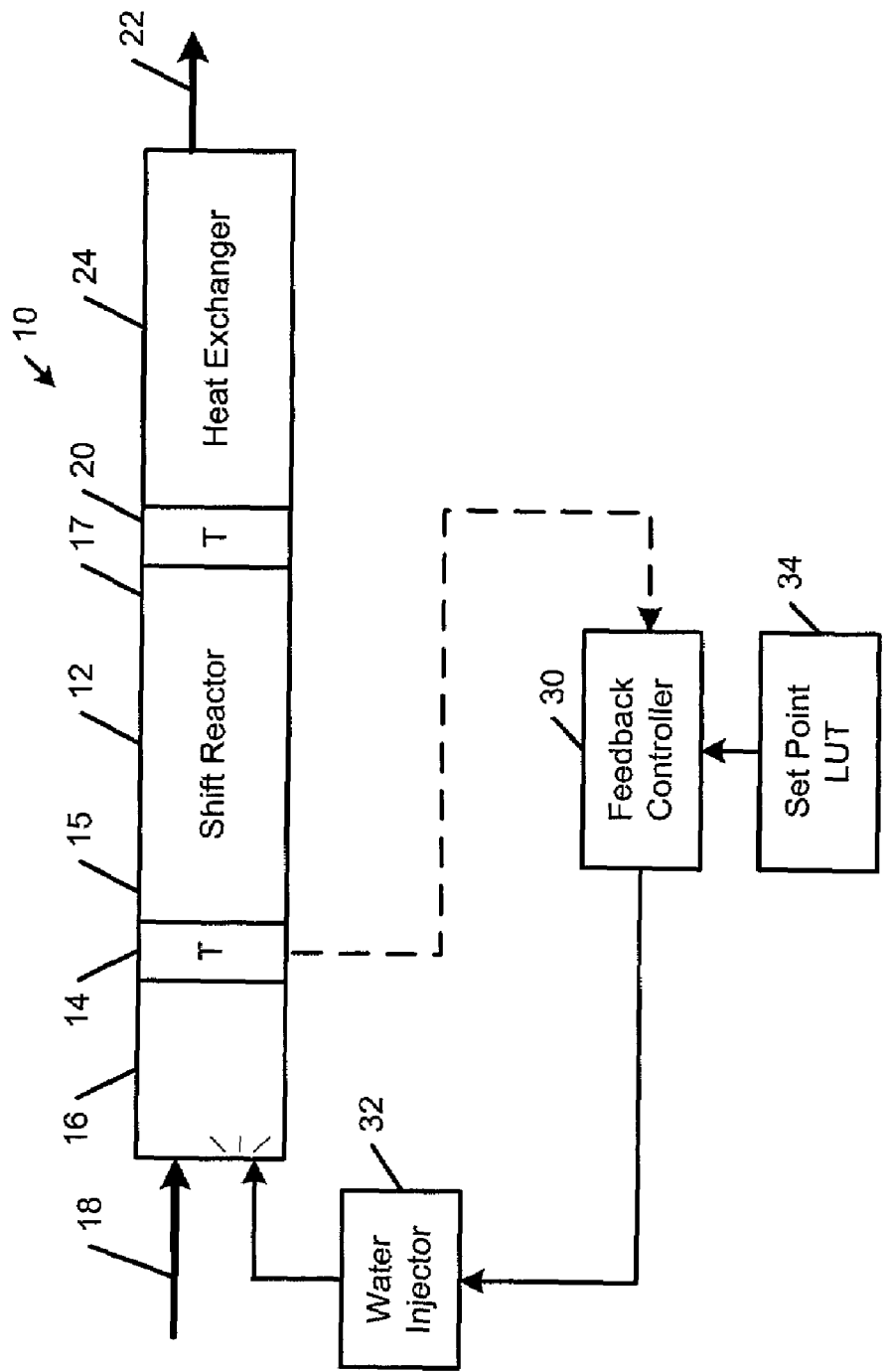
FIG. 1 is a functional block diagram of a front end temperature controller for a shift reactor according to the prior art.
Figure 2:
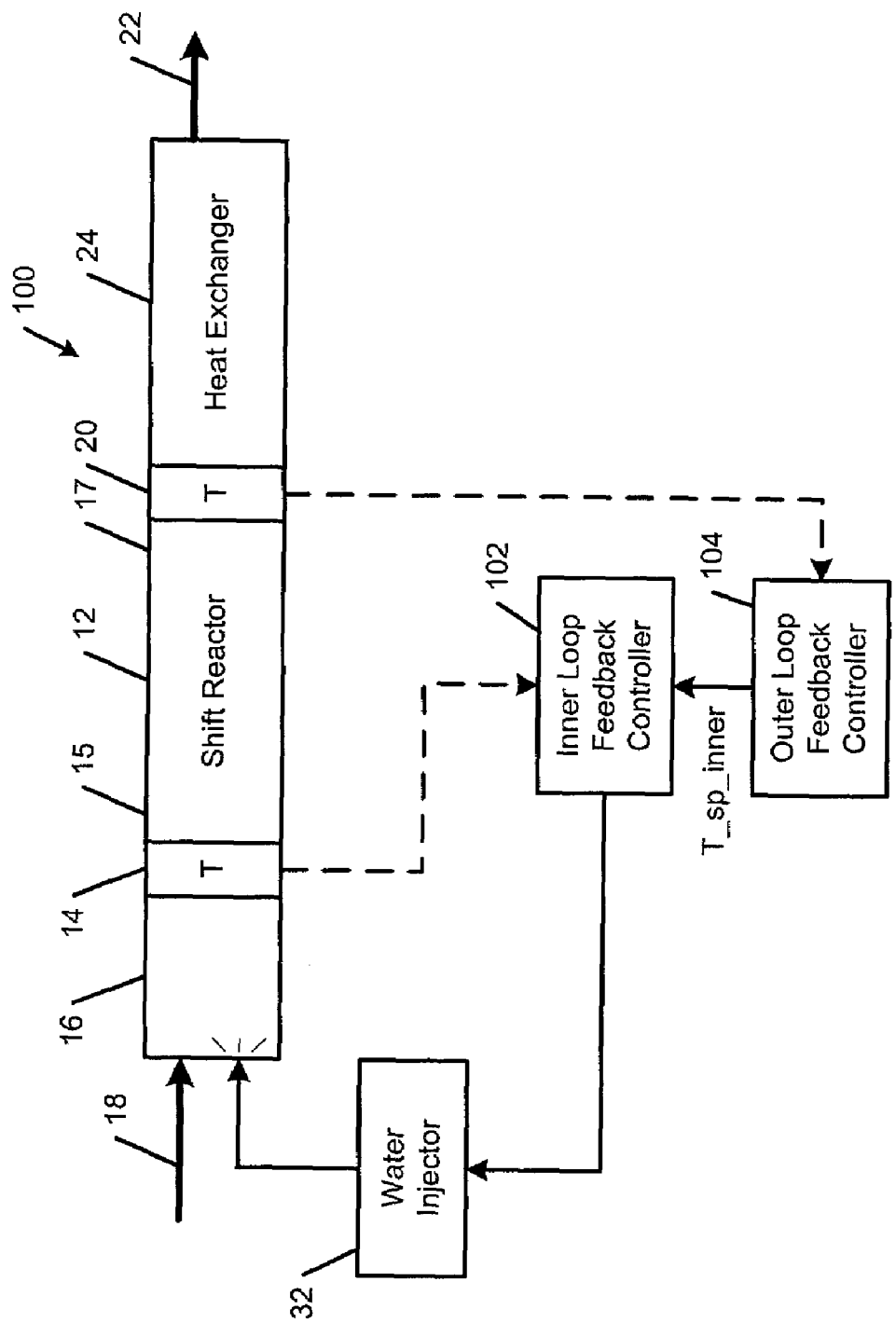
FIG. 2 is a functional block diagram of a dual controller according to the present invention that controls both front and back end temperatures of a shift reactor.

Referring now to FIG. 2, a control system 100 according to the present invention for the shift reactor 12 includes an inner loop feedback controller 102 and an outer loop feedback controller 104. The inner loop feedback controller 102 provides a rapid response to control the temperature of the front end 15. The controller 102 generates a water command to control the injector 32. The temperature set point of the inner loop (T_sp_inner) is controlled automatically based on the temperature of the back end 17. In other words, the outer loop feedback controller 104 generates the setpoint T_sp_inner for the inner loop feedback controller 102.

As can be appreciated, other devices can be used to reduce the temperature of the shift reactor 12 such as a heat exchanger. As can be appreciated, other fluids can be used to reduce the temperature of the shift reactor 12 such as liquid water injected downstream of a pipe or conduit, an autothermal reactor, a partial oxidation reformer, or another shift reactor, which are generally identified at 16. In addition, the front and/or back end temperature sensors 14 and 20 can be thermocouples or other physical or virtual temperature sensors. Virtual temperature sensors derive the front and/or back end temperatures using mathematical models and/or one or more operating parameters of the fuel cell.

The control system 100 has a dual control strategy with two feedback sensors (the front and back end temperature sensors 14 and 20), two controllers 102 and 104 and one actuator (the water injector 32). As can be appreciated, the inner and outer loop controllers 102 and 104 can be combined into a single controller that performs the functions of the inner and outer loop controllers without departing from the present invention.

From a thermal dynamic point of view, the shift reactor 12 has two processes. A first process involves cooling of the reformate stream 18 via water injection. A second process involves the heating of reactor bed exothermic reaction heat. The first process has a fast thermal dynamic (on the order of seconds). The second process has a much slower thermal dynamic (on the order of minutes). The second process is slower due to the thermal mass of the shift reactor 12. To accommodate both processes, the control system 100 employs a fast acting feedback loop to control the front end 15 and the slow acting feedback loop to control the back end 17.

There are many advantages with the control system 100 according to the present invention. The control system 100 controls the temperature of the back end 17 of the shift reactor 12 while keeping the temperature of the front end 15 under control. Also, the control system 100 uses only one actuator, which reduces cost. The control system 100 can quickly reject disturbances from the upstream unit via a fast acting inner control loop. As a result, the back end 17 is not impacted by the disturbance.

The control system 100 controls the shift reactor 12 over turndown such that the downstream heat exchanger 24 is maintained at its optimal temperature. The control system 100 also handles quick up transient operation in the shift reactor 12. During startup, the control system allows the shift reactor to produce more energy to warm up to operating temperature since the setpoint of the front end 15 is not fixed. The outer loop sets the operating temperature setpoint T_sp_inner to a higher level to drive the back end 17 to the operating temperature. As a result, faster startup times are possible.

Those skilled in the art can now appreciate from the foregoing description that the broad teachings of the present invention can be implemented in a variety of forms. Therefore, while this invention has been described in connection with particular examples thereof, the true scope of the invention should not be so limited since other modifications will become apparent to the skilled practitioner upon a study of the drawings, the specification and the following claims.

What is claimed is:

1. A temperature control system for controlling temperatures of a shift reactor, comprising:
   a back end temperature sensor that senses a temperature of a back end of a shift reactor and that generates a back end temperature signal;
   an actuator that injects fluid into a front end of the shift reactor;
   a front end temperature sensor that senses a temperature of said front end and that generates a front end temperature signal; and
   a controller that communicates with said front and back end temperature sensors and said actuator and that controls said temperature of said front and back ends using said front and back end temperature signals,
   wherein said controller is operatively connected to control the temperature of the front end in accordance with a temperature set point by a primary control loop, and operatively connected to control the temperature of the back end by a secondary control loop having a slower response time than the primary control loop and automatically controlling the temperature set point of the primary control loop based on the temperature of the back end.

2. The temperature control system of claim 1 wherein said controller is implemented using primary and secondary controllers.

3. A system comprising the temperature control system of claim 1 and further comprising a shift reactor, wherein said shift reactor is a water gas shirt reactor.

4. The temperature control system of claim 1 wherein said actuator is a water injector and said fluid is water.

5. The temperature control system of claim 1 wherein said front and back end temperature sensors are thermocouples.

6. The temperature control system of claim 1 wherein said front and back end temperature sensors are virtual sensors that employ mathematical models.

7. The system of claim 1, wherein the primary control loop and the secondary control loop are configured to ensure that the primary control loop rejects disturbances from an upstream unit, thereby ensuring that the back end is not impacted by the disturbance.

8. The system of claim 7, wherein the primary control loop and the secondary control loop are configured to maintain a downstream heat exchanger at its optimal temperature over turndown.

9. The system of claim 8, wherein the primary control loop and the secondary control loop are configured to set the operating temperature setpoint to a higher level during startup than during operation following startup, thereby driving the backend to operating temperature.

10. The system of claim 1, wherein the primary control loop and the secondary control loop are configured to maintain a downstream heat exchanger at its optimal temperature over turndown.

11. The system of claim 1, wherein the primary control loop and the secondary control loop are configured to set the operating temperature setpoint to a higher level during startup than during operation following startup, thereby driving the backend to operating temperature.

* * * * *